US009002146B2

(12) United States Patent
Akimoto et al.

(10) Patent No.: US 9,002,146 B2
(45) Date of Patent: Apr. 7, 2015

(54) OPTICAL GATE SWITCH

(75) Inventors: Ryouichi Akimoto, Ibaraki (JP); Shinichirou Gozu, Ibaraki (JP); Teruo Mozume, Ibaraki (JP); Hiroshi Ishikawa, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 13/985,699

(22) PCT Filed: Feb. 15, 2012

(86) PCT No.: PCT/JP2012/053467
§ 371 (c)(1),
(2), (4) Date: Sep. 5, 2013

(87) PCT Pub. No.: WO2012/111689
PCT Pub. Date: Aug. 23, 2012

(65) Prior Publication Data
US 2013/0343694 A1  Dec. 26, 2013

(30) Foreign Application Priority Data
Feb. 18, 2011  (JP) ................................. 2011-033397

(51) Int. Cl.
*G02F 1/035* (2006.01)
*G02F 1/295* (2006.01)
(Continued)

(52) U.S. Cl.
CPC .......... *G02F 1/01708* (2013.01); *G02F 1/2257* (2013.01); *B82Y 20/00* (2013.01); *G02F 2001/01733* (2013.01); *G02F 2001/01775* (2013.01); *G02F 2001/212* (2013.01); *G02F 2001/215* (2013.01); *G02F 2203/48* (2013.01)

(58) Field of Classification Search
USPC ......................................................... 385/3, 5
See application file for complete search history.

(56) References Cited

U.S. PATENT DOCUMENTS

| | | | |
|---|---|---|---|
| 5,754,714 A * | 5/1998 | Suzuki et al. ...................... 385/5 |
| 7,801,451 B2 * | 9/2010 | Tsuchida et al. .............. 398/201 |
| 8,086,112 B2 * | 12/2011 | Tsuchida et al. .............. 398/201 |

FOREIGN PATENT DOCUMENTS

JP  2012-8430 A  1/2012

OTHER PUBLICATIONS

Akimoto et al., "All-Optical Demultiplexing from 160 to 40/80Gb/s Using Mach-Zehnder Switches Based on Intersubband Transition of InGaAs/AlAsSb Coupled Double Quantum Wells", IEICE Trans. Electron, vol.E92-C, No. 2, Feb. 2009, pp. 187-193.

(Continued)

*Primary Examiner* — Omar R Rojas
(74) *Attorney, Agent, or Firm* — Birch, Stewart, Kolasch & Birch, LLP (57) ABSTRACT

An object of the present invention is to realize an optical gate switch of a monolithic integration type which can avoid problems of losses caused by light coupling of a phase modulation unit to a interferometer optical circuit unit, and can be minimized by integration. The optical gate switch according to the present invention includes an optical waveguide wafer in which a quantum well having a phase modulation effect which is generated by an intersubband transition is set as a core layer; a Michelson interferometer formed on the optical waveguide wafer; and a variable light intensity attenuation unit adjusting a light balance of an interferometer in one of reflection side arms of the Michelson interferometer reflection.

8 Claims, 3 Drawing Sheets

(51) Int. Cl.
    *G02B 6/12*     (2006.01)
    *G02F 1/017*     (2006.01)
    *G02F 1/225*     (2006.01)
    *B82Y 20/00*     (2011.01)
    *G02F 1/21*     (2006.01)

(56) References Cited

OTHER PUBLICATIONS

Akimoto et al., "All-Optical Wavelength Conversion at 40Gb/s with Enhanced XPM by Facet Reflection using Intersubband Transition in InGaAs/AlAsSb Quantum Well Waveguide", ECOC 2010, Sep. 19-23, 2010, 3 pages.

Gozu et al., "Cross Phase Modulation Efficiency Enhancement in In0.8Ga0.2As/Al0.5Ga0.5As/AlAs0.56Sb0.44 Coupled Double Quantum Wells by Tailoring Interband Transition Wavelength", Applied Physics Express 2, 2009, 042201, 3 pages.

International Search Report for PCT/JP2012/053467 dated May 15, 2012.

Mikkelsen et al., "Polarisation insensitive wavelength conversion of 10Gbit/s signals with SOAs in a Michelson interferometer", Electronics Letters, Feb. 3, 1994, vol. 30, No. 3, pp. 260-261.

Shoji at al., "Michelson Interferometer of Si-Wire Waveguides for Hybrid Integrated Devices", 15th OptoElectronics and Communications Conference (OECC2010) Technical Digest, Jul. 2010, pp. 868-869.

Tsuchida et al., "Cross-phase-modulation-based wavelength conversion using intersubband transition in InGaAs/AlAs/AlAsSb coupled quantum wells" Optics Letters, vol. 32, No. 7, Apr. 1, 2007, pp. 751-753.

Yoshioka et al., "Michelson Interferometer-Type Wavelength Converter Integrated with Multimode Interference Coupler; Fundamental Characteristics", Japanese Journal of Applied Physics, vol. 43, No. 6A, 2004, pp. 3424-3428.

\* cited by examiner

OPTICAL GATE SWITCH

TECHNICAL FIELD

The present invention relates to an optical gate switch.

BACKGROUND ART

It has been found that the optical excitation of an intersubband transition of an in GaAs/AlAsSb semiconductor quantum well by TM polarization light causes an occurrence of a phase modulation effect with response speed of a few picoseconds with respect to TE polarization light without absorption loss (See non-patent document 1). The present inventors have reported an ultrahigh speed optical gate switch to which the phase modulation effect is applied (See non-patent document 2). The optical gate switch has a Mach-Zehnder interferometer shape of a spatial optical system type which is configured by combining optical components with a size of a few mm to 1 cm degree, such as a mirror and a polarization splitter. The introduction of an optical waveguide including the quantum well having the phase modulation effect into one of the optical path of the interferometer allows it to function as the optical gate switch. By using the optical gate switch, reports have been made of an operation such as a de-multiplexing of an optical time-division multiplexing signal of 160 Gb/s towards a signal of 40 Gb/s, or wavelength conversion of the signal of 160 Gb/s, and a fundamental demonstration towards a device application of an ultrahigh speed phase modulation effect has been made.

An unstable operation of the gate switch becomes a problem because the optical gate switch of the spatial optical system type has the interferometer with a large size. In terms of practicality, it is desirable that the optical gate switch be minimized by producing an optical integrated circuit using components which configure the optical gate switch by using a semiconductor process technology.

In designing of the optical integrated circuit for the optical gate switch using the phase modulation effect caused by the intersubband transition, it is necessary to note the following. When TM polarization control light is propagated through the optical waveguide, it is absorbed by the intersubband transition. Thus, a refractive index of the quantum well is changed and a phase modulation is generated with respect to TE polarization signal light. On the other hand, in the optical waveguide for the phase modulation, the TE polarization is not optically attenuated by the intersubband and interband light transitions in the quantum well. For this reason, efforts are necessary in order to guide TM control light to a portion that requires the phase modulation within the optical circuit.

From the above-described viewpoint, a wavelength converter of the Michelson interferometer type using the phase modulation effect in a semiconductor optical amplifier (SOA) is disclosed as a device having a shape similar to the present invention (See non-patent documents 3 and 4). It is similar to the present invention in that the control light which is emitted from fiber is directly guided to a phase modulation unit of the optical waveguide, and that one of reflection side arms of the Michelson interferometer becomes the phase modulation unit.

While non-patent document 3 discloses that the Michelson interferometer itself is configured by an optical fiber or the coupler, non-patent document 4 discloses that the Michelson interferometer is monolithically integrated on a substrate with the semiconductor optical amplifier (SOA) effect. These documents use the phase modulation effect caused by an optical non-linearity of the semiconductor optical amplifier (SOA), and do not cover details of a technology which is necessary when the phase modulation effect caused by the intersubband transition is optically integrated. In addition, a mechanism which maintains a balance of the light intensity between optical paths of the interferometer is different from the present invention.

RELATED DOCUMENT

Patent Document

[Patent Document 1] Japanese Patent Application No. 2010-145899 (Japanese Unexamined Patent Publication No. 2012-008430)

Non-Patent Document

[Non-patent Document 1] Opt. Lett., vol. 32, no. 7, pp. 751-753, 2007.
[Non-patent Document 2] IEICE Trans. Electron., vol. E92-C, no. 2, pp. 187-193, 2009.
[Non-patent Document 3] Electron. Lett. Vol. 30 (1994) 260.
[Non-patent Document 4] Japanese Journal of Applied Physics, Vol. 43, No. 6A, 2004, pp. 3424-3428.

DISCLOSURE OF THE INVENTION

Problems to be Solved by the Invention

The group of the present inventors has proposed, as a technology associated with the present invention, a hybrid integrated optical gate switch in which a group III-V semiconductor waveguide with a phase modulation effect is directly butt-coupled to a Si wire waveguide optical circuit (See Patent Document 1). In the Si wire waveguide formed on a silicon on insulation (SOI) substrate, the refractive index difference between core and clad materials is as large as approximately two, and the curve radius of the optical waveguide can be small. Thus, advantageously, an ultra-small interferometer optical circuit can be easily realized.

In Patent Document 1, a phase modulation unit is introduced into an interferometer by connecting the optical waveguide of one arm of a reflection side of a Michelson interferometer using the Si wire waveguide to the group III-V semiconductor waveguide having the phase modulation effect. Both signal light and control light are introduced from a Si wire waveguide optical circuit side, through a butt coupling unit, to the group III-V semiconductor waveguide. The connection of the silicon wire waveguide with the group III-V semiconductor waveguide, however, requires an alignment accuracy of submicron or less, and no method has been established for matching a waveguide mode size of the silicon wire waveguide and the group III-V semiconductor waveguide, and it is difficult to obtain a sufficient optical coupling efficiency in practical use. So far, a practical optical gate switch with a form of the hybrid integration has not been realized.

In the technology of Non-patent Document 2 in which a high speed operation has been actually verified by the optical gate switch using the phase modulation effect caused by the intersubband transition, the device, which is a spatial optical system type manufactured by combining optical components, has an optical path length of the interferometer as long as approximately 10 cm. An optical path length change of a wavelength order easily occurs by an environmental change such as temperature or vibration of the surrounding where the interferometer is installed. Thus, in order to stabilize an operation of the optical gate switch, it is necessary to keep an optical path length difference of the interferometer constant.

Specifically, disadvantageously, a fine movement mechanism using a mirror with a piezo element and a position stabilization circuit are required, which results in a complex device configuration. In addition, in a case where there is a need to simultaneously operate multiple optical gate switches, it is necessary to integrate the multiple optical gate switches. In an arrangement of the spatial optical system so far, there has been a problem that the size of an entire apparatus becomes large.

In order to solve the above-described problems, it has been the object to develop an integrated optical gate switch with a small size and a high stabilization with respect to an environment change. Miniaturization is expected in the optical gate switch in which a silicon light wire and a group III-V semiconductor waveguide that are disclosed in Patent Document 1 are hybrid-integrated, but there is a problem that it is difficult to obtain a high optical coupling efficiency between the group III-V semi conductor waveguide causing phase modulation and an optical integrated circuit for an interferometer. The optical coupling losses caused by a connection unit cause a control light power sufficient and necessary to generate a phase modulation not to reach the group III-V semiconductor waveguide and a phase modulation unit. As a result, the phase modulation efficiency is decreased. Furthermore, signal light is required to reciprocate a coupling unit, and the coupling loss becomes twice as high. As described above, it is difficult to obtain sufficient signal-to-noise ratio with respect to signal light which is cut out by an optical gate.

An object of the present invention is to realize an optical gate switch of a monolithic integration type which can avoid a problem caused by the optical coupling loss of the phase modulation unit and an interferometer optical circuit unit, and can miniaturize by using integration, by considering the above situations.

Solution for Solving Problems

The above-described problems are solved by the following optical gate switch.

(1) An optical gate switch comprising:

an optical waveguide wafer in which a quantum well having a phase modulation effect which is generated by an inter-subband transition is set as a core layer;

a Michelson interferometer formed over the optical waveguide wafer; and a variable light intensity attenuation unit adjusting a light balance of an interferometer in one of reflection side arms of the Michelson interferometer.

(2) The optical gate switch according to (1), wherein the core layer comprises:

a phase modulation unit located in a partial area of an end surface side of the phase modulation side arm of the Michelson interferometer; and an area having a property of which an absorption edge wavelength of an interband transition moves to a short wavelength.

(3) The optical gate switch according to (1) or (2), wherein a partial reflection film is formed over an end surface of a reflection side arm of the Michelson interferometer so as to enable control light to be introduced.

(4) The optical gate switch according to any one of (1) to (3), wherein an anti-reflective film is formed over an end surface of a signal light input-output side arm of the Michelson interferometer.

Effect of the Invention

According to the present invention, it is possible to realize an optical gate switch which has a high stabilization with respect to an environmental change and has a small size even if it is integrated. In addition, according to the present invention, it is possible to obtain sufficient signal-to-noise ratio with respect to signal light which is cut out by an optical gate.

In addition, an area except for a phase modulation unit 15 which is connected to a port 3 generates a quantum well intermixing through P or As ion implantation and a rapid annealing, and if an absorption edge wavelength of an interband transition is shortened, optical loss of an element can be decreased and signal-to-noise ratio can be increased.

DESCRIPTION OF EMBODIMENTS

Figure 1:
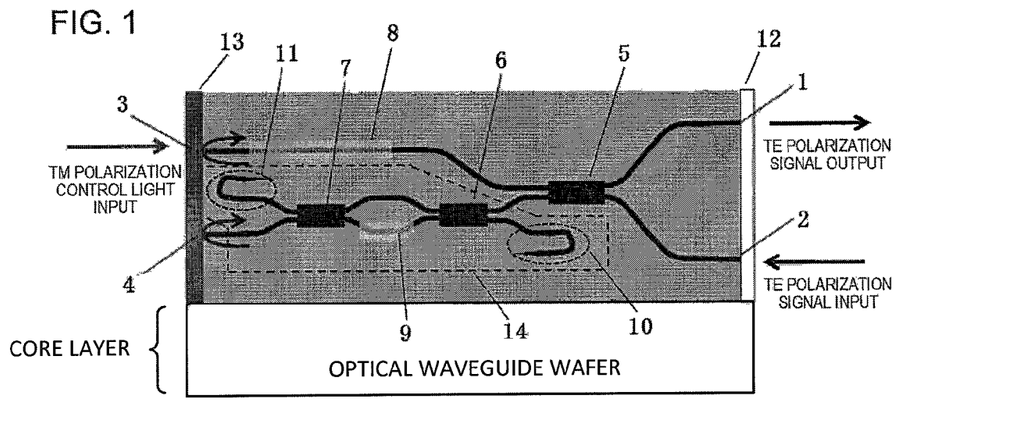
FIG. 1 illustrates a basic configuration diagram according to the present invention.

FIG. 1 illustrates a configuration diagram of an optical gate switch according to the present invention.

A whole configuration of an optical gate switch is as follows.

(1) A Michelson interferometer is configured by four input and output ports (ports 1 to 4) and a branching unit 5.

(2) The ports 1 and 2 are signal light input-output units, and an anti-reflective film 12 is installed on the ports 1 and 2. In addition, the ports 3 and 4 work as reflection units of the signal light. At the same time, a partial reflection film 13 is installed in order to allow the port 3 to function as an input unit of control light.

(3) A variable light intensity attenuation unit 14 that is formed of a Mach-Zehnder interferometer which is configured by branching units 6 and 7, a phase adjustment biasing unit 9 and attenuation units 10 and 11 is installed between the branching unit 5 and the port 4.

(4) A static phase adjustment biasing unit 8 of the Michelson interferometer which operates as an interferometer arm for a phase modulation is installed between the branching unit 5 and the port 3.

(5) A phase adjustment biasing unit 9 for variably attenuating a light intensity is installed on one of optical paths between the branching units 6 and 7.

In addition, sizes of all the branching units of the optical gate switch optical integrated circuit are designed so that the branching units may optimally operate as 3 dB branch with respect to TE polarization signal light.

Figure 7:
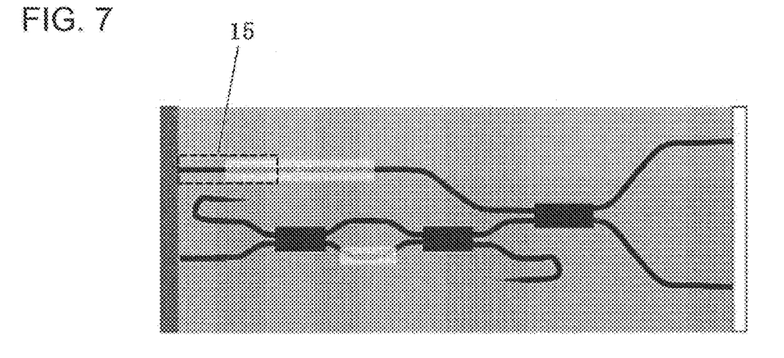
FIG. 7 illustrates a configuration of Example 2.

FIG. 7 illustrates an improved configuration of the optical gate switch according to the present invention.

(6) An area except for a phase modulation unit 15 which is connected to the port 3 generates a quantum well intermixing using P or As ion implantation and a rapid annealing, and shortens an absorption edge wavelength of an interband transition. By performing processing of the quantum well intermixing, it is possible to avoid an influence caused by an interband transition absorption which is generated when TE polarization signal light is propagated through an optical circuit. Thus, optical loss of an element can be decreased and signal-to-noise ratio can be increased.

Each portion will be described in detail.

A waveguide end surface is formed by cleavage so that the ports 1 and 2 are a signal input unit and output unit, respectively. The anti-reflective film is deposited to suppress reflection losses of a signal.

The TE polarization signal light which is input from the port 1 is branched with the same intensity by the branching unit 5 and the respective branched signal light is guided to the ports 3 and 4.

The TE polarization signal light has to be reflected at the ports 3 and 4 so that the optical path between the branching unit 5 and the port 3, and the optical path between the branching unit 5 and the port 4 become interference arms of the Michelson interferometer. For this reason, the ports 3 and 4 have the end surface formed by the cleavage, and form the partial reflection film.

The partial reflection film is installed in the waveguide end surface of the port 3, thereby TM polarization control light can be introduced into the waveguide from the port 3.

The TM polarization control light which is input into an optical waveguide from the port 3 is rapidly attenuated by an intersubband transition absorption. For this reason, it is ideal to completely attenuate the TM polarization control light within the optical path between the port 3 and the branching unit 5. The optical path length is designed so as to change the refractive index of the optical path in only this part.

Thus, the TE signal light which is reflected by the port 3 and returns to the branching unit 5 after being branched from the branching unit 5 is influenced by a reflective index change which is generated by the TM polarization control light, and experiences a phase modulation effect.

A TE polarization signal which is branched from the branching unit 5 and guided to the port 4, after passing through the variable light intensity attenuation unit which is formed of the Mach-Zehnder interferometer which is configured by the branching units 6 and 7, is reflected by the port 4 and returns to the branching unit 5 following the same path as before. An object of the variable light intensity attenuation unit will be described later.

The TE polarization signal which is reflected by the ports 3 and 4 and returned to the branching unit 5 is multiplexed again by the branching unit 5, but is guided to the port 1 or the port 2 according to an interference condition.

The phase adjustment biasing unit 8 is installed between the branching units 5 and the port 3. The phase adjustment biasing unit 8 is used for adjusting a phase bias between the arms of the Michelson interferometer other than a dynamic refractive index change using the TM polarization control light. Typically, a heater using a metal thin film is used as the phase adjustment biasing unit. It is possible to control the phase bias using the refractive index by heating the optical waveguide between the branching unit 5 and the port 3.

Next, an object and an operation of the variable light intensity attenuation unit 14 will be described.

If the TM polarization control light is input to the port 3, the control light is absorbed by the intersubband transition and converted into heat. In the waveguide between waveguide end surface of the port 3 and a part where the TM control light is attenuated, the heat is generated and the temperature of the waveguide in this part rises. As a result, an absorption edge caused by the interband transition in a semiconductor quantum well is shifted to a long wavelength side. In this situation, in a case where the TE polarization signal light is set as wavelength slightly longer than the absorption edge of the interband transition in the quantum well, the interband transition absorption of the quantum well which is shifted to the long wavelength side by a heat effect is experienced. The effect caused by the heat has a slow response speed, and shows mostly static operation with respect to the control light pulse at pulse repetition rate of 10 GHz degree or higher. The static attenuation caused by the heat effect of the signal light which is reflected by the port 3 and retuned back breaks a light intensity balance with the light which is reflected by the other arm of the Michelson interferometer. This causes decrementing of ON/OFF extinction rate due to decrementing of interference degree when the optical gate switch is operated, and interferes with the optical gate switch operation.

In order to compensate a light intensity unbalance of the Michelson interferometer caused by such a heat effect, the variable light intensity attenuation unit 14 is used. When the phase bias of both arms of the Mach-Zehnder interferometer within the variable light intensity attenuation unit 14 is zero, the TE polarization signal light which, after being input from the port 1 and branched from the branching unit 5, is guided to an arm of a variable attenuation side is entirely guided from the branching unit 7 to the port 4. As a phase difference is slightly shifted from zero using the phase adjustment biasing unit 9, a part of the light is guided from the branching unit 7 to the attenuation unit 11, thereby the light intensity is attenuated. For this reason, an optical component which is branched to the port 4 from the branching unit 7 is decreased. Furthermore, the light intensity of the optical component which returns back to the branching unit 5 is decreased, because a part of the signal light which is reflected by the port 4 is branched to the attenuation unit 10 from the branching unit 6. Thus, it is possible to control the returned light intensity of the signal light which is branched from the branching unit 5 to the variable light attenuation unit arm side, by using the phase adjustment biasing unit 9.

EXAMPLE 1

A preferred example for forming an optical gate switch of a monolithic integration type will be described.

An InP substrate is used as a wafer for forming a light integrated circuit so that a quantum well structure which generates a phase modulation effect using the intersubband transition is easily grown.

After an InP buffer layer is grown on the InP substrate using a molecular beam epitaxy method, and an InGaAs/AAsSb coupled double quantum well structure (S. Gozu et al., applied Physics Express, 2, 042201-1-3 (2009).), whose details have been disclosed, or a quantum well structure having the phase modulation effect equal to or greater than the quantum well is grown in period degree number corresponding to a thickness required for functioning as the waveguide, an upper clad layer with 1 μm thickness is grown. One of InP, InAlAs and GaAlAsSb is used as materials of the upper clad layer. Multi-stacked InGaAs/AlAsSb coupled double quantum well layer is a core layer of the optical waveguide. The total thickness of 0.5 to 0.6 µm is a proper size when the optical waveguide of a high mesa type is made.

The length (the optical path between the port 3 and the branching unit 5) of the phase modulation side arm of the Michelson interferometer have to be decided according to an absorption intensity using the intersubband transition in the core layer of the InGaAs/AlAsSb coupled double quantum well. It is preferable that the phase modulation side arm length is as short as possible from the viewpoint of minimization of the entire device size. It is preferable that the intersubband transition absorption intensity is set to minus 40 dB/mhr in order to set the entire device length as approximately 1 mm. In this case, since the light intensity is attenuated to 1% or less if the TM control light is propagated by 0.5 mm, the phase modulation side arm length of 0.5 mm or less is sufficient, and the entire device length can be 1 mm.

The refractive index with respect to the TE polarization of the InGaAs/AlAsSb coupled double quantum well layer core layer in wavelength with 1550 nm is 3.3 to 3.35 and that of InP is 3.16. By using this value, a mesa width and a curve radius of the optical waveguide configuring the light integrated circuit, and the branching unit size is decided by a simulation using a beam propagation method. It is preferable that the high mesa type which can reduce the curve radius is used as the optical waveguide. That is, as an etching depth when the optical waveguide is formed, a vertical etching of 0.2 to 0.3 µm or more is performed from the bottom of the quantum well core layer, and it is preferable that a structure which strengthens an optical confinement at the core layer toward in-plane direction of a substrate surface is formed.

If the condition of a single mode waveguide with respect to the TE polarization is calculated by using the refractive index in the optical waveguide of the high mesa type, the mesa width is approximately 2 µm or less. A multi-mode interference (MMI) coupler is adopted as a preferred example of the branching unit described later. The length of the MMI can be shortened to 102 µm if the width of the MMI is 8.4 µm. At this time, since the gap between the two optical waveguides which are connected to the branching unit needs to be 2.8 µm, 1.6 µm is adopted as the waveguide mesa width, in consideration of processing accuracy of the gap between the connection waveguides.

The branching units 5 to 7, the attenuation units 10 and 11, and the optical waveguide for connection that connects the branching unit with one another, which are illustrated in FIG. 1, are formed on the above wafer for the optical waveguide by using a general semiconductor process and a dry etching method.

A 3 dB coupler using the MMI is used as a preferred example of the branching unit. A directional coupler may be used as other candidates for the branching unit. In consideration of simulation results and ease of manufacture, a comparison of the length of the directional coupler to the length of the MMI regarding the effects of the 3 dB coupler, however, reveals that the MMI can realize the 3 dB coupler by a shorter length. For this reason, it is preferable that the MI coupler is used unless there are special circumstances. In consideration of the width of the single mode waveguide which can be connected to the MMI coupler, the processing accuracy of the gap between the connection waveguides, and the MM length required for setting the entire device length to approximately 1 mm, the MMI width is set to 8.4 µm, and the MMI length is set to 102 µm.

The attenuation units 10 and 11 configuring the variable light intensity attenuation unit 14 will be described.

In order to normally operate the variable light intensity attenuation unit 14, the signal light which is guided to the attenuation unit needs to be effectively attenuated so that it is not returned as reflected light. In the present example, an U-shaped waveguide with a curve radius of 10 µm is installed, thereby the light inside the optical waveguide is radiated to the outside by curve losses. In addition, in order to attenuate the signal light in a terminal of the U-shaped waveguide which is propagated to the terminal of the U-shaped waveguide, a taper waveguide is connected to the terminal of the U-shaped waveguide. The attenuation of the signal light is performed by adiabatically attenuating the waveguide width from 1.6 µm to 0.3 µm of a mode cut-off size or less.

After a light circuit is formed by a dry etching, the portion to be the optical waveguide is a mesa structure, and has a structure protruded from an etching surface of an upper part of the substrate. In order to protect the mesa and avoid breakage caused by the difference in the mesa level of a heater electrode for a phase adjustment device, it is desirable that an upper surface of the substrate is flattened. As a preferred example, resin with heat resistance such as Benzo Cyclo Butene (BCB) is spin-coated and a planarization is performed. In order to improve an adhesion between the BCB and an etching surface, it is preferable that the planarization using the BCB is performed after a $Si_3N_4$ film is formed by sputtering.

Subsequently, the phase adjustment biasing units 8 and 9 are installed. In this example, as the phase adjustment biasing units 8 and 9, a heater and a pad for an electrode are formed by using Ti (100 nm)/Au (100 nm) using a general semiconductor process. The width of the heater is set to 10 µm.

Subsequently, after thinning to a thickness of approximately 100 µm by lapping the back side of the substrate, a device chip is cut out by the cleavage. In order to adjust a reflectivity of the ports 1 to 4 in a cleavage end surface, deposition of a dielectric film is performed by an ECR sputter apparatus. When the dielectric film is deposited by an ECR sputter method, the forming of the dielectric film preferably follows cleaning of the end surface by exposing the cleavage end surface to Ar plasma in the ECR sputter apparatus, from the viewpoint of the adhesiveness.

Two layer films of $ZrO_2$ (chip side) and $SiO_2$ are deposited on the end surfaces of the ports 1 and 2, which are illustrated in FIG. 1, as anti-reflective films. On the other hand, two layer films of $SiO_2$ (chip side) and $ZrO_2$ are deposited at the side of the ports 3 and 4, as 50% reflection films.

Figure 2:
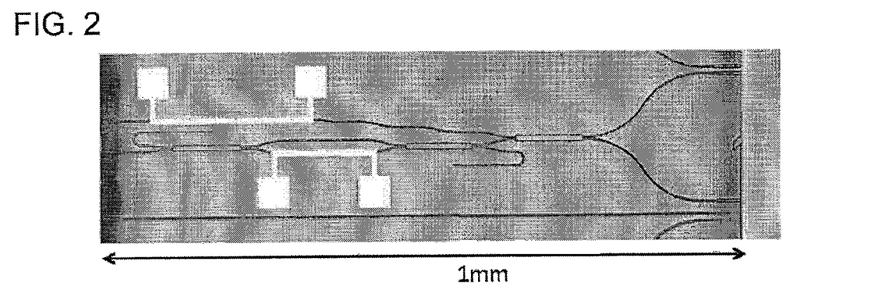
FIG. 2 illustrates an optical photomicrograph of an optical gate switch which is experimentally produced.

FIG. 2 is a photomicrograph which is observed in an upper portion of an experimentally-produced monolithic integration optical gate switch. In the device with a length of 1 mm, the Michelson interferometer, the variable light intensity attenuation unit and the like are integrated.

Characteristics of Optical Gate Switch)

According to the example, characteristics of an experimentally-produced monolithic integration type optical gate switch will be described.

Figure 3:
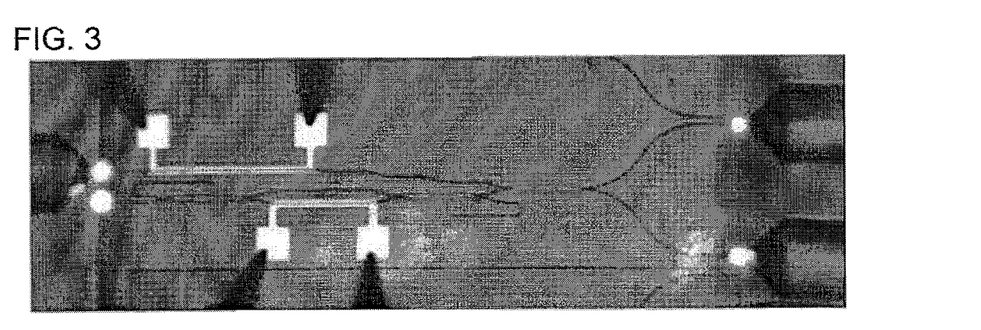
FIG. 3 is a photo of the optical gate switch which is experimentally produced during an operation testing.

FIG. 3 is a photo showing that a state where continuous wave (CW) signal light of the TE polarization with wavelength of 1560 nm is input from the port 2 is photographed by an infrared camera and a microscope. The photo is photographed on condition that no current flows to the heaters of the phase adjustment biasing units 8 and 9.

It can be confirmed that the signal light which is branched from the branching unit 5 reaches the end surfaces of the ports 3 and 4, and the signal light which is slightly converted into a radiation mode at the end surface looks shiny and white.

Furthermore, that the guidance of the light reflected from the ports 3 and 4, after being combined at the branching unit 5, to the port 1 can be confirmed by the white shining of the signal light slightly converted into the radiation mode at the end surface of the port 1.

Next, in order to study in detail the operation of the Michelson interferometer and the variable light intensity attenuation unit, while a voltage is applied to the phase adjustment biasing units 8 and 9, and the heaters are heated, the intensity of the signal light which is output from the port 1 is measured.

Figure 4:
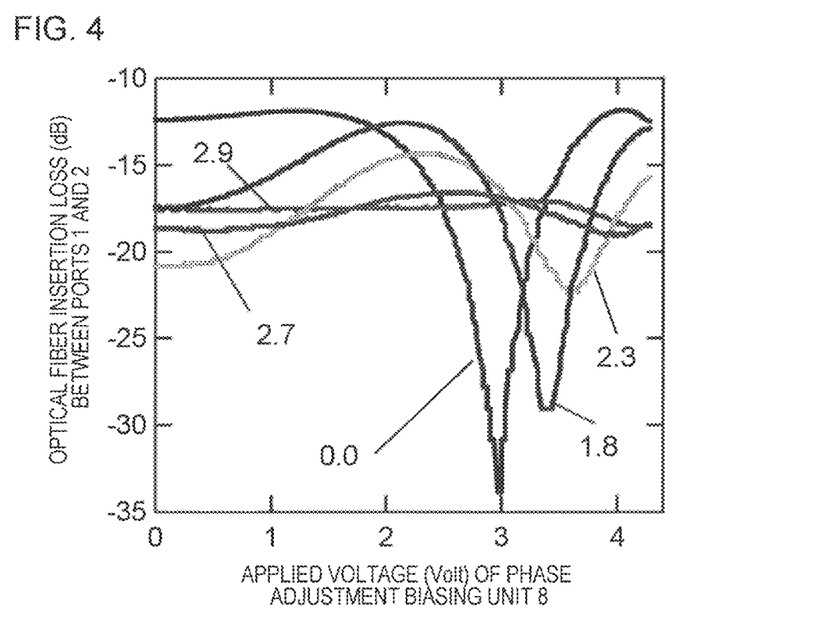
FIG. 4 illustrates static ON/OFF extinction characteristics of the optical gate switch which is experimentally produced.

FIG. 4 illustrates static ON/OFF extinction characteristics of the experimentally-produced optical gate switch. The numbers illustrated in FIG. 4 indicates the applied voltages (Volt) of the phase adjustment biasing unit 9. When the voltage of the phase adjustment biasing unit 9 in a variable light attenuator is zero (attenuation amount is zero), if the voltage of the phase adjustment biasing unit 8 is changed, an intensity change of 24 dB is obtained. This shows that the static ON/OFE extinction rate of the optical gate switch is a performance which clears a value (to 20 dB degree) required by a normal use.

Next, while increasing the voltage of the phase adjustment biasing unit 9 in the variable light intensity attenuation unit, if the voltage of the phase adjustment biasing unit 8 is changed, it can be found that the magnitude of a signal change, which is due to the interference of the signal light output from the port 2, is decreased. This shows that when the voltage of the phase adjustment biasing unit 9 is increased, the variable light attenuator starts to operate and the light intensity which is reflected by the port 4 to return is decreased, thereby the light intensity balance of the Michelson interferometer is broken. In this way, it is confirmed that the variable light attenuator operates without problems.

Next, FIGS. 5(a) and (b) illustrate results that confirm an optical gate operation by inputting the TM polarization control light (pulse repetition of 10 GHz, wavelength of 1545 nm, pulse width of 2.4 ps, and pulse energy of 8.7 pJ) from the port 3, and the TE polarization signal light (CW, wavelength 1560 nm) from the port 2, and by measuring time waveforms of the signal light returned to the port 2 and the signal light output to the port 1. FIG. 5(a) illustrates the signal light returning to the port 2, and FIG. 5(b) illustrates the signal light output to the port 1. In addition, a circulator is used to separate the signal light returned to the port 2 from an input signal.

Figure 5:
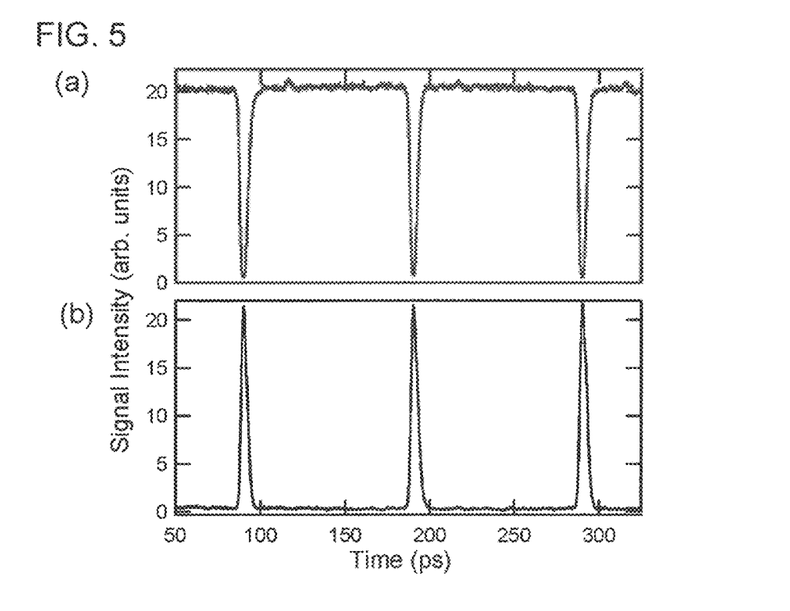
FIG. 5 illustrates dynamic switch characteristics of the optical gate switch which is experimentally produced.

In FIG. 5, according to timing in which the TM control light is incident to the port 3 every 100 ps, an upward change (FIG. 5(b)) in the light intensity of the TE polarization signal light which is output from the port 1 occurs. In addition, as illustrated in FIG. 5(a), a downward change occurs in the signal light which returns to the port 2.

Under the condition of FIG. 5, the applied voltage of the phase adjustment biasing unit 8 is adjusted to 3.45 V. Under a phase bias condition, when the control light is not incident to the waveguide, the strongest signal intensity with the most constructive interference condition returns to the port 2. On the other hand, at this time, the output signal of the port 1 becomes the most destructive interference condition, and the light signal with the weakest intensity of approximately zero is output to the port 1. In the time waveforms illustrated in FIGS. 5(a) and (b), a time domain showing a flat signal intensity corresponds to a time domain in which the control light is not incident to the waveguide, and corresponds to the most constructive condition and the most destructive condition with respect to the ports 2 and 1, respectively.

In a state of being held in the above-described interference condition, when control light pulses are input to the port 3 and absorbed into the waveguide by the intersubband transition, the phase of the signal light which is reflected by the arm side for a phase modulation is shifted by at most $\pi$ radian. Thus, in the port 2, the interference condition is changed to the most destructive state, and the signal intensity is decreased near zero. Subsequently, if a phase modulation effect which is generated by the control light is extinguished, the signal light is recovered to the strongest original intensity state. For this reason, downward pulse shaped light signal intensity change is observed in FIG. 5(a). On the other hand, the port 1 has a light intensity time change contrary to the port 2. That is, when the control light pulses are incident, it is changed to the most constructive interference condition, and the signal light with the strongest intensity is output by being synchronized with the incidence of the control light pulses. For this reason, upward pulse shaped light intensity change is observed in FIG. 5(b).

The time waveforms illustrated in FIG. 5(b) corresponds to time response of the gate operation. A half width value of the measured peak waveforms is 3.2 ps. On the other hand, the half value width of the pulse of the input control light is 2 ps, and the gate operation time is greater than the input width of the control light. It is considered that the time deviation delay occurs by the amount of time required for the electrons excited from a base sub-band into an upper sub-band by the intersubband transition to relax to the base sub-band. As described above, the operation of the optical gate switch can be confirmed by the phase modulation effect caused by the intersubband transition.

Next, the optical gate switch is operated in optical time division multiplexing signal (return-to-zero (RZ) signal of 40 Gb/s is multiplexed by 4 channel time) of 160 Gb/s required in a light transmission system using an ultrahigh speed optical time division multiplexing method, and a pulse train separation operation which extracts one channel amount of the multiplexed signal is performed. A signal (wavelength is 1560 nm) of 160 Gb/s is input from the port 2 as the TE polarization signal light, and the TM polarization control light (wavelength is 1545 nm, repetition is 40 GHz, pulse width is 2.4 ps, and pulse energy is 2.9 pJ) is input from the port 3. When the control light is not input, the applied voltage of the phase adjustment biasing unit 8 is adjusted to 1.54 Volt so that the signal of 160 Gb/s is not output from the port 2.

Figure 6:
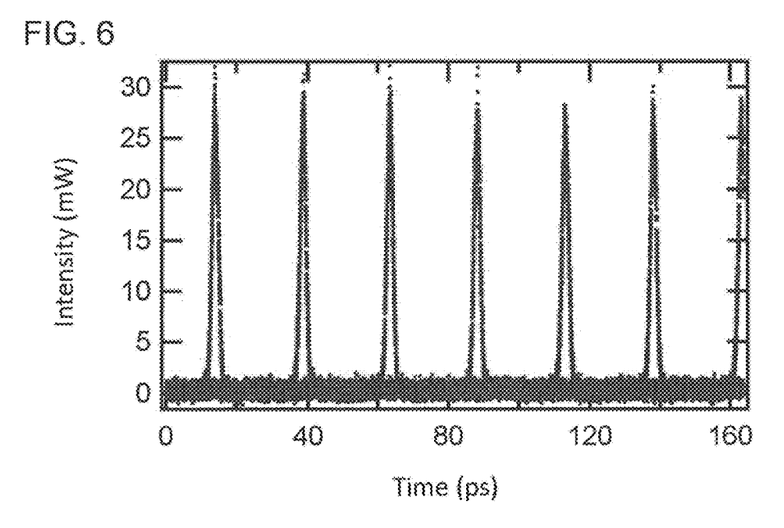
FIG. 6 illustrates output waveforms of 40 Gb/s which are obtained when a pulse train separation operation is performed, after signal light of 160 Gb/s is input to the optical gate switch which is experimentally produced.

FIG. 6 illustrates a signal of 40 Gb/s which is output from the port 1 and pulse-train-separated. It is confirmed that the light intensity is suppressed to a noise level, only specific channels of an optical time-division multiplexing signal are well separated, in a time domain between data signals which are observed every interval of 25 ps.

EXAMPLE 2

Example 2 is an example which is improved to decrease propagation losses of an element with respect to the TE polarization signal light in addition to the basic configuration of Example 1. It will be described with reference to FIG. 7. FIG. 7 illustrates a structure for decreasing the losses with respect to the signal light of the waveguide except for the phase modulation unit, in the basic configuration diagram (See FIG. 1) of the present invention. In an area other than a phase modulation unit 15 illustrated in FIG. 7, the quantum well intermixing is generated using phosphorus ion implantation and a rapid annealing. The structure of Example 2 is formed in the same manner as Example 1, but differs in the next step. A mask is formed by $SiO_2$ or the like in an area corresponding to the phase modulation unit 15 on a wafer for forming an optical integrated circuit. Next, for example, P or As ion with dose amount of $1 \times 10^{14}$ to $1 \times 10^{15}/cm^2$ is implanted in the area other than the phase modulation unit 15. The ion implantation energy is set so that distribution of depth direction of the implanted ions may have a peak value near the center portion of an upper InP clad layer. Vacancies are injected into an upper InP clad layer crystal along with the ion implantation. Subsequently, the vacancies are diffused from the upper clad layer to a lower quantum well core layer by rapidly heating at 700 to 800° C. and annealing, thereby atoms are mixed between a barrier layer and the quantum well layer generating the intersubband transition. Accordingly, the absorption edge wavelength of the interband transition moves to a short wavelength, and it is possible to decrease the propagation losses of the signal light. After the quantum well intermixing is generated by the above-described ion implantation and rapid annealing, it is possible to form the branching units 5 to 7, the attenuation units 10 and 11, and the optical waveguide for connection that connects the branching unit with one another, which are illustrated in FIG. 1, by using the general semiconductor process and the dry etching method.

As illustrated in FIG. 7, the phase modulation unit 15 is positioned at a partial area of an end surface side of the phase modulation side arm of the above-described Michelson interferometer. In Example 2, a core layer includes the phase modulation unit, and an area having a property of which the absorption edge wavelength of the interband transition moves to a short wavelength. It is possible to set the length of the phase modulation unit 15 to ⅒ to 1, for example, ½ of the length of the phase modulation side arm of the Michelson interferometer. It is preferable that the length of the phase modulation unit connected to the port 3 is set to a distance where the TM wave which is incident from an end portion (port 3) of the phase modulation side arm is attenuated, but may be longer than the distance. It is preferable that the core area having a property of which the absorption edge wavelength of the interband transition moves to the short wavelength is set as an entire core layer other than the above-described phase modulation unit in terms of reduction of the propagation losses of the signal light, but there is the reduction effect even in a partial core layer.

REFERENCE NUMERALS

| | |
|---|---|
| 1 | port 1 |
| 2 | port 2 |
| 3 | port 3 |
| 4 | port 4 |
| 5 | branching unit 5 |
| 6 | branching unit 6 |
| 7 | branching unit 7 |
| 8 | phase adjustment biasing unit 8 |
| 9 | phase adjustment biasing unit 9 |
| 10 | attenuation unit 10 |
| 11 | attenuation unit 11 |
| 12 | anti-reflective film 12 |
| 13 | partial reflection film 13 |
| 14 | variable light intensity attenuation unit 14 |
| 15 | phase modulation unit 15 |

The invention claimed is:

1. An optical gate switch comprising:
an optical waveguide wafer in which a quantum well having a phase modulation effect which is generated by an intersubband transition is set as a core layer;
a Michelson interferometer formed over the optical waveguide wafer;
a partial reflection film and an anti-reflective film installed on respective ports of the Michelson interferometer;
a phase modulation unit located in a partial area of an end surface side of the phase modulation side arm of the Michelson interferometer; and
a variable light intensity attenuation unit adjusting a light balance of an interferometer in one of reflection side arms of the Michelson interferometer.

2. The optical gate switch according to claim 1, wherein the core layer comprises:
an area, other than the phase modulation unit, which has having a property of which an absorption edge wavelength of an interband transition moves to a short wavelength.

3. The optical gate switch according to claim 1,
wherein the partial reflection film is formed over an end surface of a reflection side arm of the Michelson interferometer so as to enable control light to be introduced.

4. The optical gate switch according to claim 1,
wherein the anti-reflective film is formed over an end surface of a signal light input-output side arm of the Michelson interferometer.

5. The optical gate switch according to claim 2,
wherein the partial reflection film is formed over an end surface of a reflection side arm of the Michelson interferometer so as to enable control light to be introduced.

6. The optical gate switch according to claim 2,
wherein the anti-reflective film is formed over an end surface of a signal light input-output side arm of the Michelson interferometer.

7. The optical gate switch according to claim 3,
wherein the anti-reflective film is formed over an end surface of a signal light input-output side arm of the Michelson interferometer.

8. The optical gate switch according to claim 5,
wherein the anti-reflective film is formed over an end surface of a signal light input-output side arm of the Michelson interferometer.

* * * * *